Figure 1:
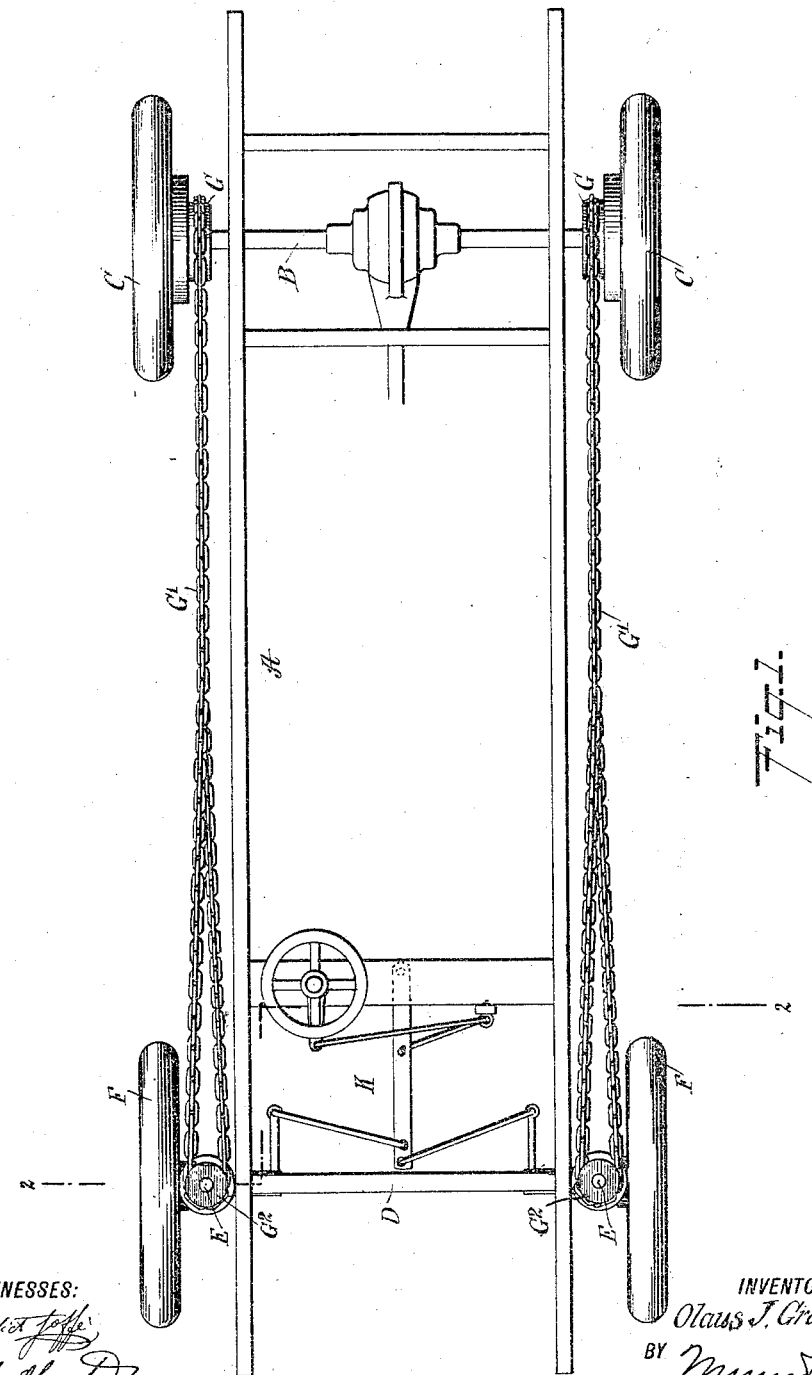

O. J. GRAN.
DRIVING GEAR FOR MOTOR VEHICLES.
APPLICATION FILED OCT. 4, 1910.

1,030,081.

Patented June 18, 1912.
2 SHEETS—SHEET 1.

WITNESSES:

INVENTOR
Olaus J. Gran
BY
ATTORNEYS

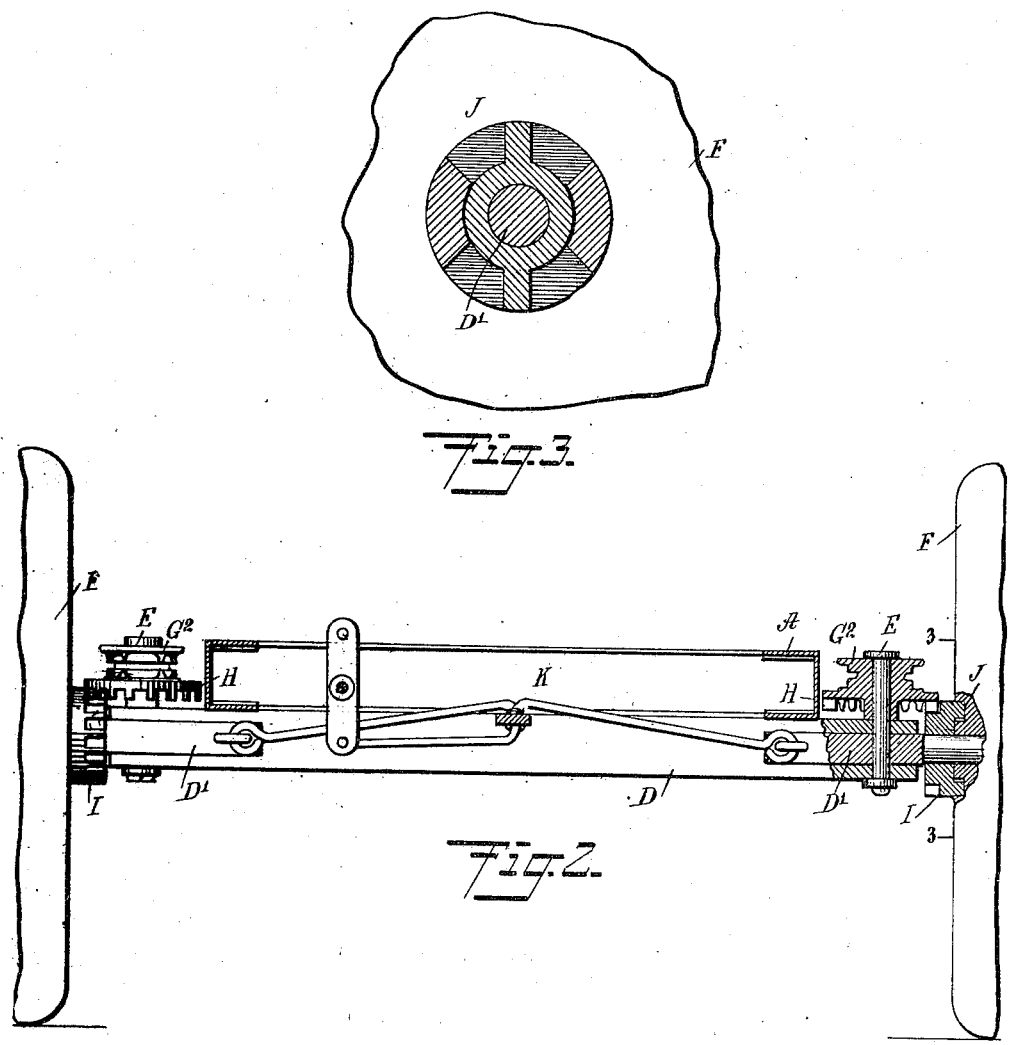

UNITED STATES PATENT OFFICE.

OLAUS J. GRAN, OF CALLAHAN, CALIFORNIA.

DRIVING-GEAR FOR MOTOR-VEHICLES.

1,030,081.   Specification of Letters Patent.   Patented June 18, 1912.

Application filed October 4, 1910. Serial No. 585,233.

*To all whom it may concern:*

Be it known that I, OLAUS J. GRAN, a citizen of the United States, and a resident of Callahan, in the county of Siskiyou and State of California, have invented a new and Improved Driving-Gear for Motor-Vehicles, of which the following is a full, clear, and exact description.

The object of the invention is to provide a new and improved driving gear for automobiles and other motor vehicles, arranged to transmit the power applied by the motor to the rear axle to the front axle without interfering with the steering gear, to compensate for the variation of speed of the front or steering wheels when turning from a straight path, and to prevent skidding.

For the purpose mentioned, use is made of gear wheels, adapted to turn with the front or steering wheels of the vehicle, and in mesh with driven gear wheels journaled on the front axle in axial alinement with the pivots of the stub axles, and sprocket chain and sprocket wheel connections between the said driven gear wheels and the rear axle of the vehicle.

Reference is to be had to the accompanying drawings forming a part of this specification, in which similar characters of reference indicate corresponding parts in all the views.

Figure 1 is a plan view of the driving gear for motor vehicles; Fig. 2 is an enlarged cross section of the same on the line 2—2 of Fig. 1; and Fig. 3 is an enlarged sectional side elevation of the lost motion connection between a front or steering wheel and the gear wheel for the driving of the said front or steering wheel.

On the axle frame A of a motor vehicle is journaled the rear axle B, driven in the usual manner by the motor of the vehicle, and on the said rear axle B are secured the rear wheels C of the motor vehicle. On the axle frame A is secured the front axle D carrying stub axles D', mounted to swing horizontally on pivots E carried by the front axle D, and on the said stub axles D' are mounted to turn loosely the front or steering wheels F, as plainly indicated in Figs. 1 and 2.

In order to drive the front or steering wheels F from the driven rear axle B, use is made of the following construction: Sprocket wheels G are secured on the rear axle B and are connected by sprocket chains G' with sprocket wheels G² mounted to rotate loosely on the pivots E for the stub axles D', and the said sprocket wheels G² are secured to or form part of front axle gear wheels H, in mesh with stub axle gear wheels I mounted to rotate loosely on the stub axles D'. The stub axle gear wheels I serve to drive the front or steering wheels F, and for this purpose a lost motion clutch connection J connects each gear wheel I with the corresponding front or steering wheel F. Now when the motor vehicle is in use and the rear axle B is driven by the motor, then a rotary motion is transmitted to the front axle gear wheels H by the sprocket chain and wheel connections G, G', G², and the rotary motion of the gear wheels H is transmitted to the stub axle gear wheels I which in turn rotate the front or steering wheels F. Thus by the arrangement described both the rear and front wheels of the motor vehicle are driven simultaneously. The stub axles D' are connected with a steering gear of any approved construction so that the said stub axles can be turned on the pivots E to steer the motor vehicle sidewise from a straight path.

In order to compensate for the difference in motion between the inner and outer front or steering wheels when the vehicle turns a corner, use is made of the lost motion clutch connection J, so that the inner wheel can travel slower than the outer wheel while on the curve.

The driving gear shown and described is very simple and durable in construction, and positively drives the front wheels from the rear axle. It will also be noticed that by the arrangement described the strain incident to the travel of the motor vehicle is equally distributed on all four tires and the strain is reduced to a minimum. It is understood that by driving both front and rear wheels of the vehicle simultaneously the vehicle can climb steep grades with ease and without increase in the motive power applied.

Having thus described my invention, I claim as new and desire to secure by Letters Patent:

1. A driving gear for power vehicles, comprising a driven rear axle, wheels on the axle, sprocket wheels on the said axle adjacent to the wheels, a fixed front axle having pivoted stub axles, the pivots of the axles being extended, front wheels on the stub axles, gear wheels mounted to turn on the stub axles, and having a lost motion clutch connection with the hubs of the said front wheels, gear wheels mounted on the extended portions of the pivots of the stub axles and meshing with the gear wheels on the stub axles, sprocket wheels secured to the gear wheels on the pivots of the stub axles, and sprocket chains passing around the said sprocket wheels.

2. A driving gear for power vehicles, comprising a driven rear axle, wheels on the axle, sprocket wheels on said axle adjacent to the wheels, a fixed front axle having pivoted stub axles, the pivots of the axles being extended above the upper face of the front axle, front wheels on the stub axles, gear wheels mounted to turn on the stub axles and connected with the said front wheels, gear wheels mounted on the extended portions of the pivots of the stub axles and meshing with the gear wheels on said stub axles, sprocket wheels on the upper face of and integral with the gear wheels on the pivots of the stub axles, and sprocket chains passing around the said sprocket wheels.

In testimony whereof I have signed my name to this specification in the presence of two subscribing witnesses.

OLAUS J. GRAN.

Witnesses:
CHESTER GEORGE STRICKLAND,
HARRY PHILLIP EVANS.

---

Copies of this patent may be obtained for five cents each, by addressing the "Commissioner of Patents, Washington, D. C."